April 26, 1960  H. D. WILSON  2,934,582
PERMANENTLY BONDED BATTERY ELEMENTS

Filed April 3, 1957  2 Sheets-Sheet 1

INVENTOR.
HARLAND D. WILSON
BY
ATTORNEYS

April 26, 1960 H. D. WILSON 2,934,582
PERMANENTLY BONDED BATTERY ELEMENTS
Filed April 3, 1957 2 Sheets-Sheet 2

INVENTOR.
HARLAND D. WILSON
BY
ATTORNEYS

United States Patent Office 2,934,582
Patented Apr. 26, 1960

2,934,582

PERMANENTLY BONDED BATTERY ELEMENTS

Harland D. Wilson, Birmingham, Mich., assignor to The Electric Auto-Lite Company, Toledo, Ohio, a corporation of Ohio Application April 3, 1957, Serial No. 650,429

8 Claims. (Cl. 136—17)

This invention relates to secondary storage batteries, more particularly to a means for cementing the lower edges of the plates and separators to the bridges at the bottom of the battery container whereby the fully assembled battery is held together as an integral unit.

In the past, particularly with the so-called "off the road" vehicles such as tractors, trucks and the like, which are subjected to very severe vibration and/or shock due to the conditions under which they are used, such as very rough terrain, the batteries used in connection with the operation of these vehicles have suffered excessive damage due to such vibration and shock and by attrition of the elements of the battery arising from the rubbing together of adjoining surfaces by slight movement during the vibration or shock. The life expectancy of the batteries has been materially shortened by the damage to their component parts, which may consist of loosening and loss of electrical capacity of positive and/or negative active materials, abrasive erosion of the separators or notching of the bottoms of the separators by repeated impingement on the bridges and consequent disorientation resulting in eventual short circuit of the positive and negative plates through treeing or mechanical contact, of various other types of damage such as seal rupture, lead burn and bushing failure, and plate breakage.

The present invention contemplates a method of permanently affixing both the pasted plates, positive and negative, and the separators to closely juxtaposed container surfaces such as the upper surface of the spaced bridges located at the bottom of the container, to hold the battery elements rigidly in place to prevent movement of the parts during severe vibration or shock. The invention further contemplates a method of attaining these ends, which is suitable for application to the production of batteries on a mass production line.

It is, therefore, a principal object of this invention to provide a means whereby the plates and separators comprising the elements of a battery cell may be permanently affixed to the container of the battery to form an integral unit.

It is a further object of this invention to provide a method whereby the plates and separators comprising the elements of a battery cell may be permanently affixed to the container for the cell.

It is a further object of this invention to provide a means, and a method for providing the means for affixing the plates and separators of a battery cell to its container which is suitable for application to a mass production line.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
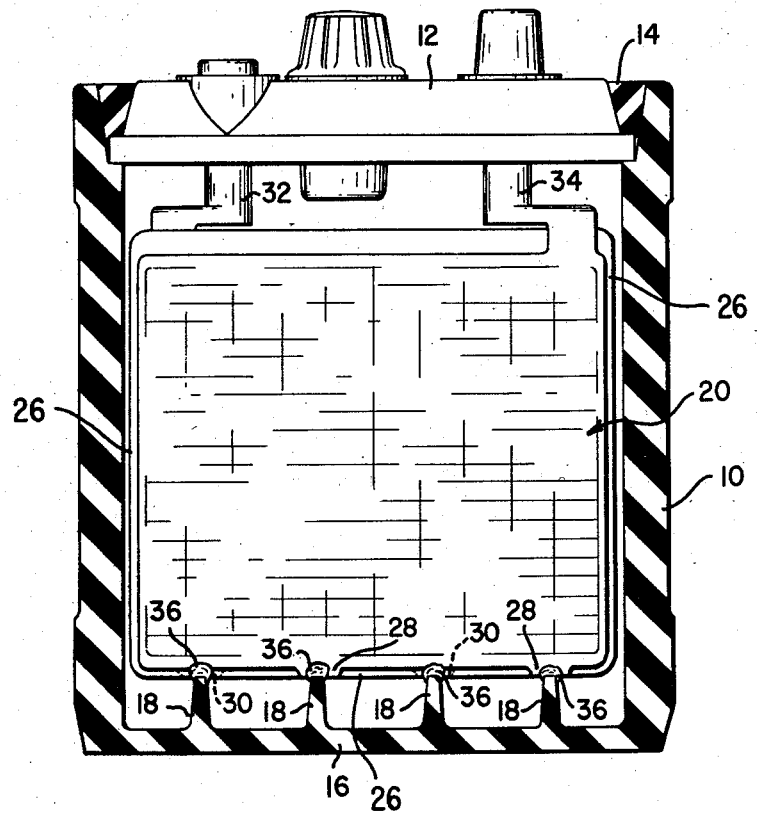
Fig. 1 is a sectional elevation of a battery cell to which the invention has been applied.

Referring now to the drawings, particularly to Fig. 1, a battery is shown, to which the invention has been applied. The battery consists of a conventional box or container 10, having a suitable cover 12 sealed therein by an asphaltic sealing body 14, all as is well known in the art. The floor 16 of the box is provided with the usual bridges or electrode rests 18 which spaces the bottom edges of the plates of the battery element 20 from the floor 16 and provides room for the sediment to collect. The battery element 20 is made in the usual manner, comprising positive and negative plates 22 and 24 separated by insulating elements or separators 26, which preferably are made of artificial cellulosic material, although they may be made of cedar wood or other suitable materials if desired. The negative plates are provided with feet 28 which rest on one pair of the bridges, while the positive plates have similar feet 30 to rest on the other alternate pair of bridges. The plates, both positive and negative, are burned to common post straps at their upper ends which are provided with terminal posts 32 and 34 which extend through the cover in the well known manner. The construction of the battery is conventional and may vary considerably in detail.

In the past, the battery element 20 has been placed in operative position in the box 10, and blocks or shims (not shown), usually consisting of parts of separators, were placed between the sides of the outer negative plates and the adjacent side of the box to hold the element tightly in the box. This was not completely satisfactory for the purpose of preventing limited movement of the whole element 20 with reference to the box or relative movement between the portions making up the battery element viz, the positive and negative plates and the separators. Either the fit was not perfect or sizing of the materials forming the construction occurred resulting in loss of compression and would still allow some movement of the element or its parts. The present invention solves this problem by integrally bonding the feet 28 and 30 of the plates and also the adjacent portions of the separators to the top of the bridges 18, so that the element 20 and its component parts are permanently affixed to the box 10 at their top and bottom portions, by the post straps 32 and 34 at the top of the element and by the integral bonding to the bridges at the bottom.

Figure 2:
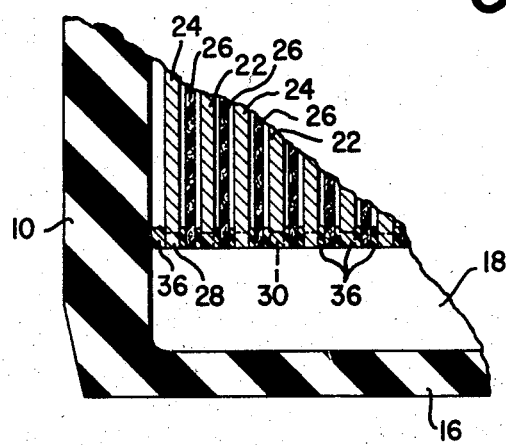
Fig. 2 is a sectional elevation of the same cell shown in Fig. 1, taken normal to the view of Fig. 1 through a bridge.

The integral bond at the bottom is provided by bodies of bonding material 36, preferably positioned between the feet 28 and 30 on the plates and the upper surface of the bridges 18, the body being so positioned that the material flows up between the adjacent elements and contacts the lower edge of the plates as is best seen in Fig. 2. A study of this figure of the drawing indicates that an interlock is formed, which is mechanical as well as an adhesive integral bond with the plates, the separators and the bridges. The bonding material is applied as a viscous body which conforms itself to the contour of the element, as shown, and adheres to them to form the integral bond which, when hardened or set, becomes a rigid bonding body to hold the parts permanently together. It will be noted that the body of bonding material does not materially reduce the openings between the plates and the separators at their bottom edges to thereby reduce the facility with which the battery electrolyte may circulate through the interstices between the plates and the separators. If the circulation of the electrolyte is hampered, the efficiency and performance of the battery is seriously reduced.

The bonding material 36 is a compound which is resistant to chemical attack in the battery system, is innocuous to the chemical system of the battery, is a nonconductor of electricity, and is capable of being hardened or set-up into a strong and rigid body which will firmly adhere to the parts to be integrally bonded. The preferred materials are the thermosetting resins of the epoxy, furfural or phenolic types. These resins are available commercially.

A preferred resin among the epoxy type of resins is commercially available under the trade-name Bisonite G5—54—B and accelerator G5—54—C made by The Bistonite Company of Buffalo, New York. This resin is of a thermosetting liquid epoxy casting resin having a specific gravity of approximately 1.20 which can be cured or hardened with the addition of a suitable curing agent, and the optional application of moderate heat. This resin has the further advantage that it will cure when submerged in the electrolyte of the battery, which, therefore, permits the immediate addition of the electrolyte to the battery cell in a production line, without having to wait for the resin to cure under other conditions.

These resins and their properties are described in the following publications: "Modern Plastics," volume 33, No. 8 (April 1926) pages 125 and 174; "Synthetic Resins & Applied Plastics" by R. S. Morrell, Chapter 1, Oxford University Press, 1943 (second edition); "Plastics" by H. R. Fleck, Chapter 1, Chemical Publishing Company, Inc., Brooklyn, New York, 1945; "Polymer Progress," Shell Chemical Corporation, No. 1, April 1955, "The Chemistry of Epoxy Resins." Generally speaking, a suitable epoxy resin may be produced as a condensation product of epichlorohydrin and bisphenol–A with different grades of products being obtained depending on the mol ratio of epichlorohydrin to bisphenol–A and/or the conditions of the reaction. The epoxy resin thus obtained is cured or hardened to form the bond between the element and the container by the reaction with a curing agent such as diethylene triamine and the optional use of moderate heat.

Figure 3:
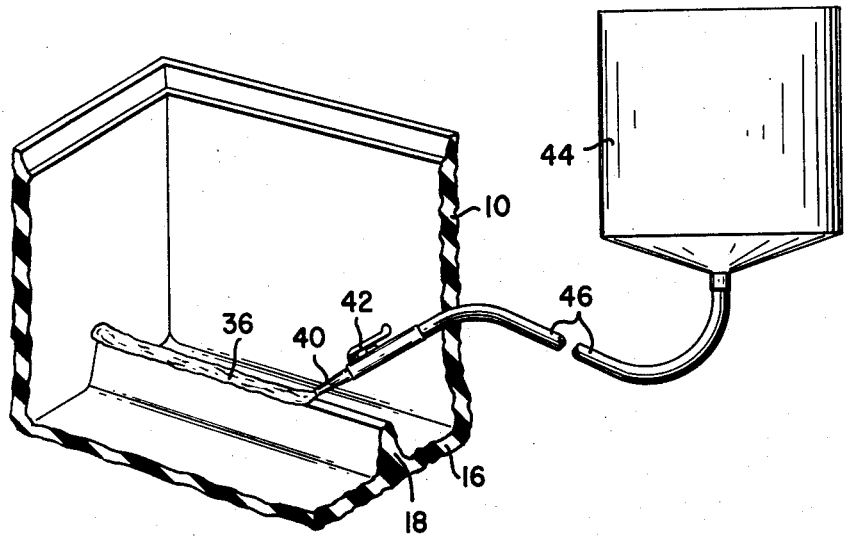
Fig. 3 is an isometric view of a battery container portion illustrating one method of carrying the invention into practice.

The method of placing the resin in position in the battery cell may vary to suit conditions. Referring to Fig. 3 of the drawings, one method is illustrated where the resin is placed in the form of a thick, viscous ribbon on the upper surfaces of the desired bridges 18 by a nozzle 40, which is provided with a valve 42, and connected with a resin supply 44 by means of a flexible connecting hose 46. The resin supply may be special, depending upon the characteristics of the resin and will not be described in detail, but it is clear from the figure that a gravity feed system may be used, although a pressure system is also applicable. The resin has flow characteristics which allow it to remain substantially in situ as extruded from the nozzle 40 but is sufficiently plastic to assume the condition shown in Fig. 2, when the complete battery plate assembly 20 is lowered into the box 10 to rest on the bridges 18 as shown. That is to say, the resin has substantial form stability with flow characteristics. The upper surface of each of the desired bridges 18 is covered with the resin before the element 20 is lowered into the box. Other application methods other than the nozzle 40 can be utilized, if desired, such as brushing, smearing or the like.

Figure 4:
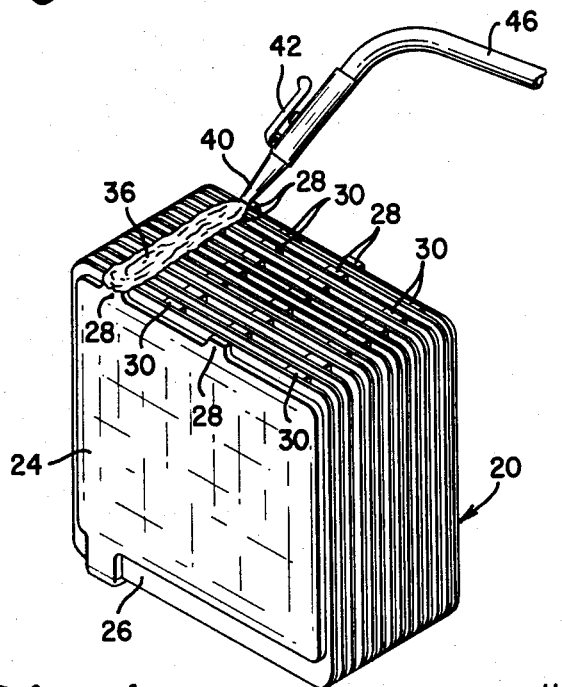
Fig. 4 is an isometric view of an assembly battery cell element showing another method of carrying the invention into practice.

Another method of applying the resin is illustrated in Fig. 4 where the resin is extruded by the nozzle 40 on the bottom of the inverted battery element cell assembly 20 in the loci of the feet 28 and 30, which are covered with a ribbon of the viscous resin as shown. One or more ribbons may again be applied, so that when the treated assembly is lowered into the box 10, each ribbon will contact one of the bridges 18 to result in the structure illustrated in Figs. 1 and 2. In the method shown in Fig. 4, the action of gravity assists in disseminating the resin into the battery plate assembly to make better contact therewith, particularly with the separators, and then when the treated assembly is lowered into the box 10, the gravity force will tend to give the resin better contactual relation with the bridges by a slight flowing, so that a better bond will result between the parts.

In the preferred method of applying the invention to a mass production line for batteries, a resin is selected which will harden or set up at room temperatures to form a strong, rigid, tenacious bonding body between the battery element and the case in which the element is positioned. If desired, other curing or hardening methods may be applied to the resin forming the bonding body.

The bonding body may be formed at the sides of the element 20 to bond it to the sides of the battery case, if desired, without materially changing the elements of structure or the characteristics of the resin. However, in the preferred form, the bonding by the resin body 36 is positioned at the bottom edge, as illustrated and described hereinbefore. It is believed this is the most efficient form of the invention.

Although the invention has been described for use with thermosetting resin of the epoxy, furfural and phenolic types, either natural or artificial resins of the thermoplastic type and various adhesive materials may also be used, including adhesives having a tar or asphaltic base, providing the bonding materials have the characteristics set out above.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The method of affixing an assembly of battery cell elements including positive and negative plates and separators to closely juxtaposed wall portions of a container, comprising positioning adhering bodies of a liquid bonding material on either the assembly or on the wall portions of the container, positioning the assembly in the container to place the parts covered with the unset bonding material in contact with the closely juxtaposed portion of the other element to cause the unset bonding material to adhere thereto, and setting the bonding material into a rigid body adhering to the parts to provide a permanent bond between them.

2. The method of affixing an assembly of battery cell elements including positive and negative plates and separators to closely juxtaposed bottom wall portions of a container, comprising positioning adhering bodies of a viscous, acid-resistant, bonding material on either the assembly or on the bottom wall portions of the container, placing the assembly in the container to place the parts covered with the unset bonding material in contact with the closely juxtaposed adjacent portion of the other element, and hardening the bonding material into a rigid body to provide a permanent bond between the parts.

3. In a battery, an assembly of battery cell elements including positive and negative plates and separators, a container for said assembly having bottom wall portions closely juxtaposed to said assembly, and a self-hardening rigid bonding means positioned between said assembly and said bottom wall portions adhering to each and providing a mechanical interlock for holding the elements together in a fixed permanent relation.

4. The method of affixing an assembly of battery cell elements including positive and negative plates and separators to closely juxtaposed wall portions of a container, comprising positioning an unset body of viscous, self-hardening bonding material between the assembly and said juxtaposed wall portions adhering to both elements, the unset bonding material having substantial form stability with flow characteristics, and hardening the material to a rigid condition in said position to form a mechanical interlock to provide a permanent bond between the parts.

5. The method of affixing an assembly of battery cell elements including positive and negative plates and separators to closely juxtaposed bottom wall portions of a container, comprising positioning bodies of a viscous, self-hardening bonding material on portions of the assembly, placing the assembly in the container in operating position to place the portions covered with the unset bonding material in contact with the closely juxtaposed portions of the walls of the container so as to cause the bonding material to adhere to each portion, and setting the bonding material into a rigid body to provide a permanent bond between the parts.

6. In a battery, an assembly of battery cell elements including positive and negative plates and separators, a container for said assembly having upwardly projecting bridge elements positioned on the bottom thereof for supporting the assembly, and a body of rigid polymerized bonding material positioned on at least one of the bridge elements in the container bottom adhering to the bridge element and to juxtaposed portions of the assembly resting thereon including the positive and negative plates and the separators, to provide a rigid mechanical interlock to hold the elements together in a permanent relation.

7. In a battery, an assembly of battery cell elements including positive and negative plates and separators, a container for said assembly having upwardly projecting bridge elements positioned on the bottom thereof for supporting the assembly, a body of rigid self-hardening bonding material positioned on at least one of the bridge elements in the container bottom adhering to the bridge element and to juxtaposed portions of the assembly resting thereon including the positive and negative plates and the separators, to provide a rigid mechanical interlock to hold the parts together in a permanent relation, and a cover for the container cooperating with terminal portions of the assembly.

8. In a battery, an assembly of battery cell elements, including positive and negative plates and separators, a container of rigid insulating material for said assembly, having integral upwardly-projecting bridge elements positioned on the bottom thereof for supporting the assembly, and a body of unset, self-hardening bonding material positioned on at least one of the bridge elements in the bottom of the container adhering to the bridge element and the portions of the assembly resting thereon, including the positive and negative plates and the separators, said body of unset bonding material having substantial form stability with flow characteristics to flow into and adhere to the adjacent assembly portions when the assembly is positioned on the bridge element in contact with the bonding material, thereafter the bonding material in a predetermined period of time self-hardens into a rigid holding body permanently bonding the parts together.

References Cited in the file of this patent

UNITED STATES PATENTS

| | | |
|---|---|---|
| 720,653 | Apple | Feb. 17, 1903 |
| 1,239,835 | Smith | Sept. 11, 1917 |
| 1,419,396 | Manwaring | June 13, 1922 |
| 2,205,992 | Phillips | June 25, 1940 |

FOREIGN PATENTS

| | | |
|---|---|---|
| 126,236 | Australia | Dec. 24, 1947 |